US010458486B2

(12) United States Patent
Dole et al.

(10) Patent No.: US 10,458,486 B2
(45) Date of Patent: Oct. 29, 2019

(54) CLUTCH MECHANISM AND METHOD FOR INSTALLING SUCH MECHANISM ON TRANSMISSION DRIVETRAIN

(71) Applicant: VALEO EMBRAYAGES, Amiens (FR)

(72) Inventors: Arnaud Dole, Marcelcave (FR); Francois Thibaut, Longueau (FR)

(73) Assignee: Valeo Embrayages, Amiens (FR)

( * ) Notice: Subject to any disclaimer, the term of this patent is extended or adjusted under 35 U.S.C. 154(b) by 0 days.

(21) Appl. No.: 15/457,663

(22) Filed: Mar. 13, 2017

(65) Prior Publication Data

US 2017/0268583 A1 Sep. 21, 2017

(30) Foreign Application Priority Data

Mar. 16, 2016 (FR) ..................................... 16 52228

(51) Int. Cl.

*F16D 25/12* (2006.01)
*F16D 13/52* (2006.01)
*F16D 21/06* (2006.01)
*F16D 25/10* (2006.01)
*F16D 25/08* (2006.01)

(52) U.S. Cl.

CPC ............. *F16D 25/12* (2013.01); *F16D 13/52* (2013.01); *F16D 21/06* (2013.01); *F16D 25/08* (2013.01); *F16D 25/083* (2013.01); *F16D 25/10* (2013.01); *F16D 2021/0661* (2013.01); *F16D 2021/0669* (2013.01); *F16D 2250/0084* (2013.01)

(58) Field of Classification Search

CPC .......... F16D 25/08; F16D 25/10; F16D 25/00; F16D 13/52

USPC ........................................................ 192/48.1

See application file for complete search history.

(56) References Cited

U.S. PATENT DOCUMENTS

2007/0221468 A1* 9/2007 George .................. F16D 13/58 192/48.611
2011/0114437 A1* 5/2011 Noehl ..................... F16D 21/06 192/48.601
2012/0152684 A1* 6/2012 Hauck ..................... F16D 13/52 192/48.1

FOREIGN PATENT DOCUMENTS

DE 102010051447 A1 5/2011
DE 102010051911 A1 6/2011
DE 102011115227 A1 4/2012
DE 102014209618 A1 12/2014

* cited by examiner

*Primary Examiner* — Jacob S. Scott
*Assistant Examiner* — James J Taylor, II
(74) *Attorney, Agent, or Firm* — Berenato & White, LLC

(57) ABSTRACT

A clutch mechanism intended to be installed between an engine and a transmission of a motor vehicle. The clutch mechanism is configured to be installed on the transmission (400) in two steps and by means of an axial locking system for axial locking of the control system (300) with respect to a clutch (100, 200). The axial locking system comprises a first axial locking element (304, 402) for implementing at least an axial retention between the control system (300) and the transmission (400), and a second axial locking element (600) for implementing at least an axial retention between the clutch (100, 200) and a shaft (A1, A2) of the transmission, and a means for rotational coupling of a clutch support (500) with respect to the control system (300), the rotational coupling means being different from the axial locking system.

15 Claims, 4 Drawing Sheets

10
400
401
402
301
310
300
304
320
321
307
331
330
302
105
205
204
108
208
106
104
100
102
101
103
107
109
206
200
203
110
210
114
116
117
121
130
131
132
601
600
610
120
220
115
503
303
306
305
504
500
113
118
111
202
201
207
212
240
112
140
A2
A1
O 400
307
304
300
303
503
306
504
500
115
220
120
600
116
130
132
131
A2
A1

400
304
307
801
802
300
800
803
805
504
503
500
804
220
120
600
121
130
131
A2
A1

CLUTCH MECHANISM AND METHOD FOR INSTALLING SUCH MECHANISM ON TRANSMISSION DRIVETRAIN

CROSS-REFERENCE TO RELATED APPLICATIONS AND CLAIM TO PRIORITY

This application is related to Patent Application No. 1652228 filed Mar. 16, 2016 in France, the disclosure of which is incorporated herein by reference and to which priority is claimed.

FIELD OF THE INVENTION

The present invention relates to a clutch mechanism, and more specifically to a device and a method for installing such a clutch mechanism on a transmission drivetrain. It exists in the field of transmissions, in particular for motor vehicles.

BACKGROUND OF THE INVENTION

Clutch mechanisms comprising the following are known from the existing art:

- an engine input hub that can be joined to an engine input shaft in particular by means of a torsional damper and/or a flexible plate;
- an output hub that can be linked to a transmission, and in particular to a shaft of a gearbox;
- a multiple-disc clutch comprising:
  - a plurality of first friction elements rotationally integrally connected to the input shaft by means of an input disc carrier and the input hub;
  - a plurality of second friction elements rotationally integrally connected to the output shaft by means of an output disc carrier and the output hub;
- a control system comprising a housing and an actuator configured to set the clutch in a position located between:
  - an engaged position for which the plurality of first friction elements of the clutch are rotationally coupled to the plurality of second friction elements of said clutch; and
  - a disengaged position for which the plurality of first friction elements of the clutch are rotationally decoupled from the plurality of second friction elements of said clutch.

The disadvantage of the known clutch mechanisms is that it is not easy to install them on other elements of the transmission drivetrain, in particular in the housing of a gearbox. More specifically, integrated assembly of such clutch mechanisms often requires specific means for fastening onto the housing of a gearbox, for example. These specific fastening means are generally radially bulky because they must be arranged radially outside the clutch mechanism so as to allow access to said fastening means for the operator performing the installation.

It is therefore necessary to devise specific solutions for each combination of a clutch with an element of the transmission drivetrain, for example a gearbox, so that integration thereof becomes costly and often complex.

An increasing need therefore exists in the automotive field to standardize subassemblies and, as appropriate, to find solutions which are sufficiently versatile to allow existing subassemblies to be installed on one another. More specifically, a need exists to propose economical and standardizable solutions for installing a clutch mechanism on a transmission drivetrain in two steps, the first step comprising installation of the control system on the transmission drivetrain, and the second step comprising installation of the clutch on the control system.

The object of the present invention is to address the above problems at least in large part, and furthermore to produce other advantages.

Another purpose of the invention is to solve at least one of these problems by way of a novel clutch mechanism.

Another purpose of the present invention is to implement, at less cost, installation of a clutch on a transmission drivetrain in two steps.

Another purpose of the present invention is to reduce the mass of a clutch and to standardize the installation thereof on a wide variety of transmission drivetrains.

SUMMARY OF THE INVENTION

According to a first aspect of the invention, at least one of the aforementioned objectives is achieved with a clutch mechanism intended to be installed between an engine and a transmission, said mechanism comprising: (i) a subassembly having at least one clutch and a clutch support configured to support the clutch radially by means of a rolling bearing; (ii) a control system comprising a housing and at least one annular piston configured to move axially with respect to the housing in order to engage or disengage the clutch, the clutch support being arranged in an axially intermediate position between said control system and an output hub of the clutch mechanism; (iii) a system for axial locking of the control system with respect to the clutch, said axial locking system comprising a first axial locking element configured to implement at least an axial retention between the control system and the transmission, and a second axial locking element configured to implement at least an axial retention between the clutch and a shaft of the transmission; and (iv) a means for rotational coupling of the control system with respect to the clutch support, said rotational coupling means being different from the axial locking system, and specifically from the second axial locking element.

Because the rotational coupling means is different from the axial locking system, it is thus ingeniously possible to implement installation of the clutch mechanism, according to the first aspect of the invention, on a transmission drivetrain in two steps: during a first step, the control system is at least axially locked between the transmission and the transmission shaft; then, during a second step, the control system is at least rotationally coupled to the subassembly, and more specifically to the clutch support. In other words, the invention in accordance with its first aspect makes it possible firstly to install the control system on the transmission, then to axially and/or radially connect said control system to the subassembly having the clutch mechanism and the clutch support. Installation of such a clutch mechanism onto a transmission drivetrain is thus simplified, and costs for implementation and maintenance are reduced because it is possible to separately furnish the control system on the one hand and the clutch on the other hand. Differentiation of the axial locking system and the rotational coupling means furthermore allows them to be made compatible with a very large number of clutch mechanisms.

The clutch support is configured to transmit an axial load generated at at least one annular piston, in particular when the latter is displaced axially in order to engage the clutch. To do so, the clutch support is axially locked, at least during assembly, in a position located axially between the control system and the output hub of the clutch.

On the output hub side and on the engine side, the clutch support is axially locked by the second axial locking element, said second axial locking element preferably being disposed axially on the side opposite from the annular piston with respect to the clutch.

The clutch support preferably abuts indirectly against the second axial locking element. All the intermediate parts between the clutch support and the second axial locking element are advantageously configured to be able to transmit an axial load. At a minimum, they are assembled with zero play between them at the time of assembly.

The clutch support is furthermore configured to radially support the weight of the clutch by means of a rolling bearing and more specifically a bearing of the oblique rolling type in order to be able to transmit a radial load and an axial load simultaneously.

The rolling bearing is axially retained by a retention ring disposed on the side opposite from the axial load exerted by the annular piston. In other words, the retention ring is arranged axially between the rolling bearing and the output hub of the clutch.

Radially, the rolling bearing is disposed between the clutch support and the clutch.

The clutch mechanism in accordance with the first aspect of the invention preferably comprises a clutch of the wet or dry type.

Advantageously, the mechanism in accordance with the first aspect of the invention comprises two multiple-disc clutches, preferably of the wet type, the control system comprising a first and a second annular piston configured respectively to couple or decouple the first and the second clutch onto or from a first or a second shaft of the transmission by means of a first and a second output hub.

Each multiple-disc clutch comprises on the one hand a plurality of first friction elements, for example friction discs, rotationally integrally connected to the input shaft by means of an input disc carrier and an input hub; and on the other hand a plurality of second friction elements, for example plates, rotationally integrally connected to at least one of the transmission shafts by means of a first or a second force transmission member and a first or a second output hub.

The first and second force transmission members are configured to transmit an axial load, generated by the first and second annular pistons of the control system, to the second friction elements.

Alternatively, the plurality of plates are rotationally connected to at least one of the transmission shafts by means of the first or second force transmission member and a first or a second output hub, and the plurality of friction discs are rotationally connected to the input shaft by means of an input disc carrier and an input hub.

The control system is configured to set each clutch in a position between:

- an engaged position for which the plurality of first friction elements are rotationally coupled to the plurality of second friction elements; and
- a disengaged position for which the plurality of first friction elements are rotationally decoupled from the plurality of second friction elements.

Each clutch is preferably set in a position different from the other: if the first clutch is set in the engaged position, the second clutch is then preferably set in the disengaged position; and if the first clutch is set in the disengaged position, the second clutch is then preferably set in the engaged position.

Potentially, the first and the second clutch can be simultaneously set in the disengaged position.

Advantageously, in a clutch mechanism in accordance with the first aspect of the invention the control system is preferably of the hydraulic or pneumatic type, the annular piston being mounted axially slidingly on the housing.

The piston moves axially with respect to the housing in order to engage or disengage the corresponding clutch, for example by frictional coupling at the level of the first and second friction elements of the clutch, resulting ultimately in rotational coupling of the input shaft to one of the transmission shafts.

In the description hereinafter and in the claims, the following terms will be used in non-limiting fashion and in order to facilitate understanding:

- "front" or "rear" along the direction with respect to an axial orientation determined by the principal rotation axis O of the transmission system, "rear" designating the portion arranged to the right in the Figures on the transmission side, and "front" designating the left portion of the Figures on the engine side; and
- "internal/inner" or "external/outer" with respect to the axis O and along a radial orientation orthogonal to said axial orientation.

A mechanism in accordance with the first aspect of the invention can preferably comprise, in alternative or complementary fashion, at least one of the first refinements below, potentially taken in combination:

- The axial locking system is directly connected to the transmission, the first axial locking element comprising at least one direct contact with one or several faces of said transmission. The first axial locking element can comprise in particular an axial retention element configured to prevent a rearward movement of the transmission with respect to the control system.
- The first axial locking element is configured to implement planar abutment with the transmission, the first axial locking element preferably comprising an abutment face arranged on the housing of the control system and facing toward the transmission. Preferably, the abutment face of the first axial locking element is planar and is configured to come into abutment against a complementary face of the transmission, the abutment face of the first axial locking element being capable of being arranged on a rear face of the housing.
- The control system can advantageously be connected immovably to the transmission by means of fastening means that implement at least rotational locking with respect to the transmission and, in complementary or alternative fashion, axial locking or axial retention;
- The axial locking system is potentially configured to prevent any frontward and/or rearward axial relative movement between the control system and the transmission. In other words, the first axial locking element is configured to implement axial locking between the control system and the transmission.

In complementary or alternative fashion, a mechanism in accordance with the first aspect of the invention or with any one of its first refinements can comprise, in alternative or complementary fashion, at least one of the second refinements below, potentially taken in combination:

- On the transmission-shaft side, the second axial locking element can be configured to implement axial retention so as to prevent frontward movement of the clutch mechanism, which would de-integrate it from the control system and more particularly from the annular piston. In this case, the intermediate elements arranged between the transmission shaft and the control system collectively constitute an axially integral drivetrain by means of connections that are all configured to absorb an axial load exerted by one of the annular pistons between said transmission shaft and said control system.

The second axial locking element can be configured to prevent any axial relative movement between the control system and a transmission shaft and/or an engine input shaft.

On the transmission-shaft side, the second axial locking element of the axial locking system, the output hub of the at least one clutch, and the clutch support are thus configured to transmit an axial load. Preferably, a rolling bearing is interposed between the output hub of the clutch and the clutch support, and potentially between each output hub of the clutches. More specifically, a needle bearing is disposed between the output hub of the clutch and the clutch support, and potentially between each output hub of the clutches.

Advantageously, the first output hub of the clutch is in direct abutment against the second axial locking element.

The clutch support is in axial abutment with the control system, thus allowing a rearward axial load to be transmitted between said clutch support and said control system.

The second axial locking element of the axial locking system is disposed on the at least one transmission shaft and is arranged in front of the output hub of at least one clutch. It preferably comprises an axial retention element configured to transmit a frontward axial load between said output hub and said transmission shaft. Its advantageous position at the end of the load chain and on the transmission shaft thus allows easy access to the axial locking system when the transmission, and in particular the gearbox, is deinstalled from the engine. In general, the second axial locking element is in axial abutment against the transmission shaft and against the output hub of the clutch.

The second locking element of the axial locking system comprises an element of the retention ring type.

The second locking element of the axial locking system is received in a groove arranged on the at least one transmission shaft.

The second locking element of the axial locking system furthermore comprises a spacer. The axial dimensions of the spacer are adjusted so as to allow mounting of the clutch mechanism on the transmission drivetrain with zero axial play, or potentially with minimal play. More specifically, the spacer is configured so that there is no axial play between the transmission and the transmission shaft, in particular upon installation, or potentially a minimal functional play, in particular in the engaged configuration of the clutch. Use of a spacer allows said clutch mechanism to be made compatible with any transmission system, axial locking being ensured in each case by the spacer and by the axial retention element. The spacer can be produced easily and at less cost, and can easily be inserted into the transmission drivetrain.

The spacer is interposed between the second locking element of the axial locking system and the at least one output hub. More specifically, the spacer is, for example, interposed axially between the retention ring and the output hub. Mounted on a transmission shaft, the spacer can thus easily be integrated onto the transmission drivetrain. In order to facilitate installation thereof, a bore is ingeniously implemented on an input hub of the clutch mechanism. The radial dimensions of the bore are such that a non-zero space remains between the second locking element of the axial locking system and/or the spacer and the bore. Preferably, the respective radial dimensions of the bore on the one hand and of the second locking element and/or the spacer on the other hand are such that it is possible to insert a gripping tool into the bore.

A radial load associated with the at least one clutch is supported at the level of the clutch support by a rolling bearing. This configuration ingeniously allows the radial dimensions of the bearing to be reduced, said bearing being carried radially closer to the rotation axis O, thus reducing the loads that are supported and the wear on said rolling bearing. Preferably the rolling bearing is of the oblique rolling type so that an axial load and a radial load can be transmitted simultaneously.

The transmission can potentially be rotationally coupled to the control system in order to prevent any rotational relative movement between said control system and said transmission. In particular, the control system can be connected immovably to the transmission by a fastening means implementing at least rotational locking with respect to said transmission.

In complementary or alternative fashion, a mechanism in accordance with the first aspect of the invention or with any one of its first and/or second refinements can comprise, in alternative or complementary fashion, at least one of the third refinements below, potentially taken in combination:

The housing of the control system of the clutch exhibits a planar face configured to come into axial abutment against the transmission. Interaction of the planar face of the housing with an opposite face of the transmission constitutes the first axial locking element, and more specifically in the form of an axial retention element.

The mechanism in accordance with the first aspect of the invention furthermore comprises an actuation support, preferably made of metallic material such as steel or aluminum, or potentially made of plastic material.

The actuation support is connected integrally to the control system, the actuation support being at least rotationally coupled to the housing of said control system by rotational coupling means that are described in the paragraphs that follow.

The clutch support is different from the control system.

The actuation support is applied onto the housing of the control system.

The actuation support is arranged axially between the housing of the control system and an output hub of the clutch.

The clutch support is in axial abutment against the actuation support at least during assembly of the clutch mechanism.

The actuation support is mounted with an axial play with respect to the transmission, in order to ensure that axial locking between the control system and the transmission is implemented at the level of said control system. In other words, the actuation support does not contribute directly to axial locking with the transmission. The axial dimensional tolerances of the actuation support are thus loose, thereby allowing said actuation support to be produced at less cost.

The actuation support is mounted in a bore of the control system and with zero radial play with said control system. Preferably, this zero-play installation is implemented by force, and allows a rotational coupling to be implemented between said actuation support and said control system.

The actuation support is crimped in a bore of the control system, allowing a rotational coupling to be implemented between said actuation support and said control system.

The actuation support is materially integral with the housing of the control system. The term "integral" here relates to a component made of separate parts fixedly (i.e., non-moveably) connected together.

The clutch support and the control system, and more specifically the housing, are rotationally coupled with the aid of a rotational coupling means that is configured to allow the control system to be rotationally coupled to the clutch support and to prevent any rotational relative movement between said control system and said clutch support.

The clutch support is in abutment against a circumferential seat constituted on the actuation support or on the housing of the control system. The circumferential seat is advantageously arranged axially between the annular piston of the control system and the output hub of the clutch.

The means for rotational coupling between the clutch support and the control system is in the nature of a spline connection, preferably straight, or a key connection.

The rotational coupling means comprises first splines arranged, for example, on the circumferential seat of the housing of the control system or of the actuation support, and second splines arranged on a complementary seat of the clutch support.

The first splines are of the male type and the second splines are of the female type, or alternatively the first splines are of the female type and the second splines are of the male type. "Splines of the male type" are understood as splines that extend radially outward, and by analogy "splines of the female type" are understood as splines that extend radially inward.

The control system is immovably connected to the transmission by a fastening means implementing at least rotational locking with respect to said transmission, for example with the aid of an assembly screw.

The rotational coupling means is arranged in an internal space of the force transmission member, advantageously arranged radially between the clutch and the transmission shaft, and axially inside said force transmission member.

According to a second aspect of the invention a transmission for a motor vehicle is proposed, comprising a clutch mechanism in accordance with the first aspect of the invention or with any one of its refinements.

According to a third aspect of the invention, a method for installing a clutch mechanism in accordance with the first aspect of the invention or with any one of its refinements is proposed, said installation method comprising the following steps:

axially abutting the control system against the transmission;

rotationally coupling the clutch to the control system by inserting, in particular sliding, the clutch support onto a circumferential seat of the control system;

axially abutting the clutch support against the control system;

axially locking the clutch support on a transmission shaft by inserting a retention ring into a groove of the transmission shaft.

Advantageously, the method in accordance with the third aspect of the invention can comprise the following intermediate steps performed preferably before the step of axially locking the clutch support on the transmission shaft:

potentially, measuring a remaining play between the axial locking system and the clutch support;

inserting a spacer between the output hub of the clutch and the retention ring in order to reduce or even eliminate the axial play between the clutch support and the control system.

Advantageously, the method in accordance with the third aspect of the invention comprises a step of rotationally coupling the control system to the transmission, said step being performed previously to or simultaneously with the step of axially abutting the clutch support against the control system.

The axial abutment implemented between the housing and the clutch support allows a reduction of the axial size of the clutch mechanism according to the invention upon assembly thereof in two portions.

Various embodiments of the invention are provided and encompass, depending on how their possible combinations are assembled, the various optional characteristics presented here.

BRIEF DESCRIPTION OF THE DRAWINGS

Other characteristics and advantages of the invention will become evident on the one hand by way of the description below, and on the other hand by way of several exemplifying embodiments provided for indicative and non-limiting purposes with reference to the attached schematic drawings, in which.

DETAILED DESCRIPTION OF THE PREFERRED EMBODIMENT(S)

The embodiments that will be described below are in no way limiting; in particular, variants of the invention can be conceived which comprise only a selection of characteristics described below, in isolation from other characteristics that have been described, if that selection of characteristics is sufficient to confer a technical advantage or to differentiate the invention with respect to the existing art. That selection comprises at least one, preferably functional, characteristic, without structural details or with only a portion of the structural details, if that portion alone is sufficient to confer a technical advantage or to differentiate the invention with respect to the existing art.

In particular, all variants and all embodiments that are described can be combined with one another if there are no technical obstacles to such combination.

In the Figures, elements shared by multiple Figures retain the same reference.

Figure 1:
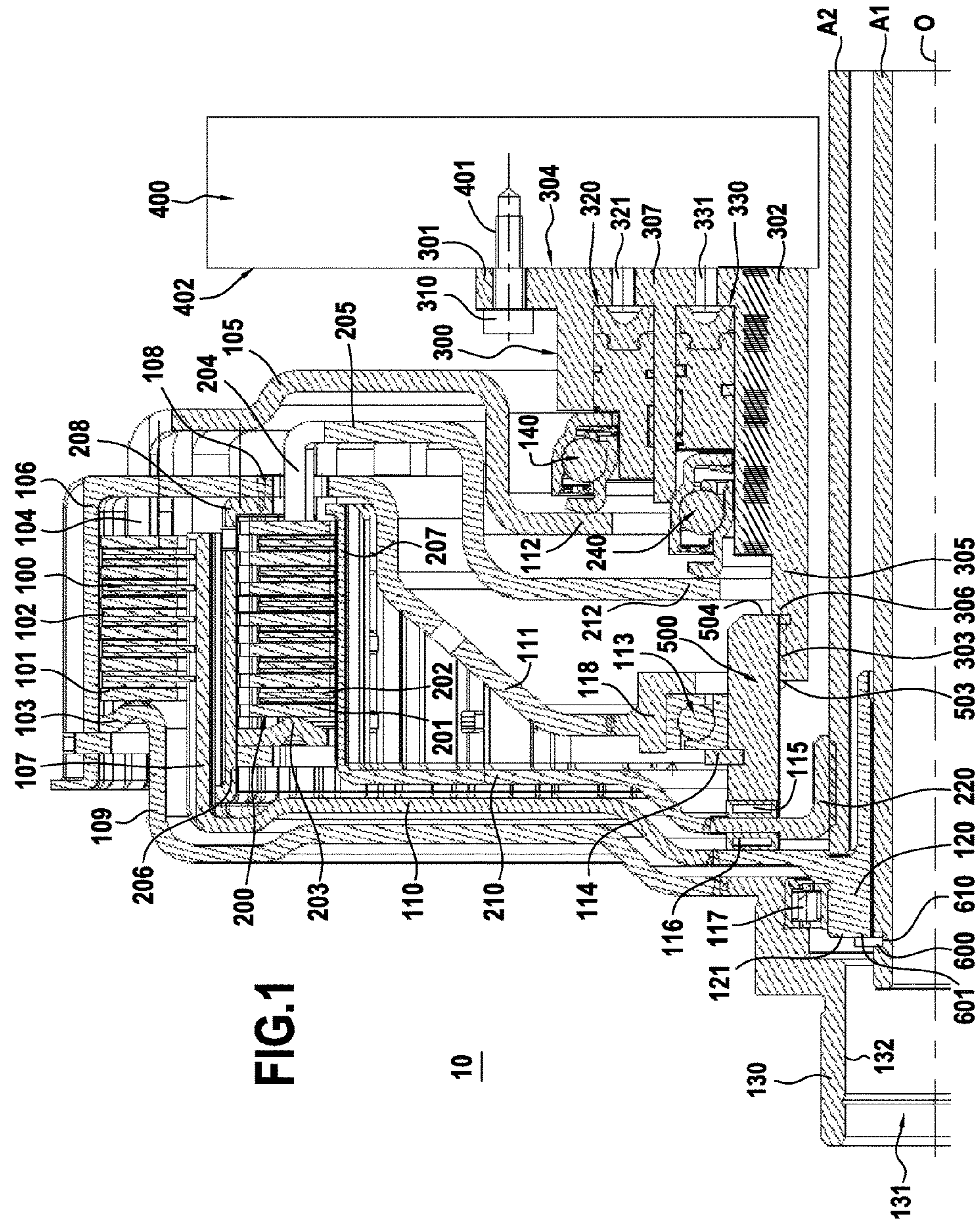
FIG. 1 is an axial section view of a transmission system comprising a dual wet clutch mechanism, according to a first aspect of the invention.

FIG. 1 depicts a clutch mechanism 10, in particular for a motor vehicle, having a principal rotation axis O.

In the paragraphs that follow, clutch mechanism 10 is presented by way of its technical and functional characteristics common to all embodiments in accordance with the first aspect of the present invention. The embodiments will then be described in terms of their specific features and differences with respect to those common technical and functional characteristics. FIG. 1 provides support for a description of the technical and functional characteristics common to all the embodiments of the first aspect of the invention.

Clutch mechanism 10 illustrated in FIG. 1 and following is of the dual wet clutch type in a so-called "radial" position, first clutch 100 being arranged preferably externally from second clutch.

Alternatively, clutch mechanism 10 can be set up in a so-called "axial" position, first clutch 100 being situated axially rearward and second clutch being situated axially frontward.

As a further alternative, clutch mechanism 10 can be of the dual dry clutch type.

Clutch mechanism 10 of the dual wet clutch type is configured to be able to selectively couple the input shaft to a first transmission shaft A1 or to a second transmission shaft A2 respectively by means of first clutch 100 or second clutch 200.

Preferably, first transmission shaft A1 and second transmission shaft A2 are coaxial.

First clutch 100 and second clutch 200 are preferably of the multiple-disc type. Each multiple-disc clutch comprises on the one hand a plurality of first friction elements, for example friction discs, rotationally integrally connected to the input shaft, and on the other hand a plurality of second friction elements, for example plates, rotationally integrally connected to at least one of the transmission shafts.

Potentially, the plurality of first friction elements comprises plates rotationally integrally connected to the input shaft, and the plurality of second friction elements comprises friction discs rotationally integrally connected to at least one of the transmission shafts.

First transmission shaft A1 is rotationally coupled to the input shaft and rotationally driven thereby when first clutch 100 is set in a so-called "engaged" position, in which the plurality of first friction elements 101 are rotationally coupled to the plurality of second friction elements 102.

First transmission shaft A1 is rotationally decoupled from the input shaft when first clutch 100 is set in a so-called "disengaged" position in which the plurality of first friction elements 101 are rotationally decoupled from the plurality of second friction elements 102.

Second transmission shaft A2 is rotationally coupled to the input shaft and rotationally driven thereby when second clutch 200 is set in a so-called "engaged" position, in which the plurality of first friction elements 201 are rotationally coupled to the plurality of second friction elements 202.

Second transmission shaft A2 is rotationally decoupled from the input shaft when second clutch 200 is set in a so-called "disengaged" position in which the plurality of first friction elements 201 are rotationally decoupled from the plurality of second friction elements 202.

In the context of the invention, transmission shafts A1 and A2 are configured to be able to interact with a transmission 400, for example a gearbox of the kind installed on motor vehicles.

In dual wet clutch mechanism 10 illustrated in FIG. 1, first clutch 100 is configured to engage the odd-numbered ratios of transmission 400, and second clutch 200 is configured to engage the even-numbered ratios and reverse gear of transmission 400. Alternatively, the ratios handled by said first clutch 100 and second clutch 200 are respectively exchanged.

First clutch 100 and second clutch 200 are configured to transmit a so-called "input" power (a torque and a rotation speed) of the input shaft alternatively to one of the two transmission shafts A1, A2 depending on the respective state of clutches 100 and 200 and by means of an input web 109.

Preferably, clutches 100 and 200 are configured to not be simultaneously in the same (engaged or disengaged) position. Potentially, first and second clutches 100, 200 can be simultaneously set in the disengaged position.

Clutch mechanism 10 has, around axis O, at least one input element that is rotationally connected to an input shaft (not depicted). The input element of clutch mechanism 10 preferably comprises at least one input hub 130. Along its lower prolongation, input hub 130 is rotationally and/or axially connected to the input shaft, potentially by means of a damping device such as a dual mass flywheel, for example.

Along its external prolongation, input hub 130 is rotationally coupled to an input web 109 at a lower end of said input web 109 arranged at the rear; preferably they are integral, for example fastened by welding and/or riveting. At its upper end, input web 109 is rotationally connected to a first clutch 100 by means of an input disc carrier 106, said input disc carrier 106 being rotationally connected to said input web 109, preferably by positively fitting interaction in particular of the spline type.

First and second clutches 100 and 200 are controlled by a control system 300 comprising a first and second actuator 320, 330. Control system 300 comprises a housing 307 whose upper part 301 is configured potentially to receive fastening means 310 interacting with transmission 400. Housing 307 of control system 300 also comprises a lower portion 302 having an axial prolongation configured to support first and second actuators 320 and 330. At its portion arranged at the rear, control system 300 has a so-called "abutment" face 304, preferably planar, configured to produce a planar abutment with transmission 400. Abutment face 304 is preferably arranged axially toward the rear of control system 300.

First and second actuators 320 and 330 are preferably of the hydraulic jack type. First and second actuators 320 and 330 can each comprise an annular piston. Control system 300 comprises a first and a second hydraulic fluid supply conduit 321 and 331 for first and second actuators 320, 330. Preferably the hydraulic fluid is a pressurized fluid, for example oil.

First actuator 320 is configured to set first clutch 100 in a position between the engaged position and the disengaged position. More specifically, first actuator 320 is axially movable, in this case from the rear frontward, between the engaged position and disengaged position of first clutch 100.

First actuator 320 is connected to first clutch 100 on the one hand by means of a first bearing 140 and on the other hand by means of a first force transmission member 105.

First bearing 140 is configured to transmit axial loads, generated by first actuator 320, to first force transmission member 105.

First force transmission member 105 is configured to transmit an axial load at its upper prolongation 104 to first clutch 100, said upper prolongation extending axially frontward so that first friction elements 101 can be moved away from or pressed against on the one hand friction elements 102, and on the other hand an external reaction means 103 of input web 109.

External reaction means 103 is rotationally coupled to input hub 130 by means of input web 109. External reaction means 103 and input web 109 are preferably made as a single part, as a variant as two parts fastened together by any means, such as riveting or welding.

External reaction means 103 has a shape complementary to that of the first or second friction elements, so as to allow frictional coupling of first and second friction elements 101, 102 when first actuator 320 applies an axial load frontward in order to set first clutch 100 in its engaged position. As a non-limiting example, the reaction means can be in the form of a disc that extends radially outward, a central region of which extends axially frontward.

External reaction means 103 has in particular an external spline set that interacts with an internal spline set of input web 109.

First clutch 100 is preferably of the multiple-disc type. It comprises at least one first friction element 101, for example a friction disc. First friction elements 101 are rotationally coupled to first transmission shaft A1 by means of an output disc carrier 110 constituting an output element of first clutch 100.

Output disc carrier 110 has on its external radial periphery an axial prolongation 107 that is equipped with a tooth set intended to interact with a complementary tooth set on each first friction element 101, and more specifically on the radially internal periphery of each first friction element 101. The output disc carrier is thus rotationally coupled, by meshing, to first friction elements 101.

At its lower radial end, output disc carrier 110 is connected to a first output web 120. First output disc carrier 110 and first output web 120 are preferably fastened together by welding, as a variant by riveting.

First output hub 120 has, radially internally, axial splines configured to interact with complementary splines arranged on first transmission shaft A1, in order to implement a rotational coupling.

First clutch 100 also comprises elastic return means to push first actuator 320 automatically back into a disengaged position. The elastic return means are preferably constituted by elastic washers such as spring washers of the "Onduflex™" type. The elastic return washers are interposed axially between second friction elements 101, 102. They are preferably situated radially inside first friction elements 101. Each elastic return washer is axially in abutment against the front radial face of a second friction element 102 and against the rear radial face of another, axially adjacent, second friction element 102.

The elastic return means axially stress the second friction elements in order to facilitate the release of first friction elements 101 and the return of first actuator 320 toward the disengaged position.

As a variant (not depicted), the return means of first actuator 320 are constituted by at least one spring.

Second clutch 200 of clutch mechanism 10 is similar in design to first clutch 100, second clutch 200 preferably being of the multiple-disc type.

Advantageously, for a description of second clutch 200 reference may be made as necessary to the detailed description of first clutch 100 provided above.

Comparably to the position described for first clutch 100, second actuator 330 is configured to set second clutch 200 in a position between the engaged position and the disengaged position.

Second actuator 330 is connected to second clutch 200 on the one hand by means of a second bearing 240 and on the other hand by means of a second force transmission member 205.

The second actuator preferably comprises an annular piston mounted axially slidingly on housing 307 of the control system.

Second bearing 240 is configured on the one hand to transmit axial loads, generated by second actuator 330, to second force transmission member 205, and on the other hand to support the radial load exerted by first force transmission member 105.

Second force transmission member 205 is configured to transmit an axial load, at its upper prolongation 204, to second clutch 200, said upper prolongation 204 extending axially frontward and through an opening 108 configured in input disc carrier 106 so that first friction elements 201 can be moved away from or pressed against, on the one hand second friction elements 202, and on the other hand an internal reaction means 203.

Internal reaction means 203 is integral with an axial prolongation portion 206 oriented frontward and integral with input disc carrier 106 by means of a radial prolongation portion 208 that is fastened to input disc carrier 106 by any means, for example by welding or by riveting. Alternatively, internal reaction means 203 and input disc carrier 106 are implemented as a single part.

Second force transmission member 205 is arranged axially between input disc carrier 106 and first force transmission member 105.

Second force transmission member 205 comprises on its lower part a bore 202 in order to leave an internal space, so as not to produce a radial abutment against control system 300 or against one of transmission shafts A1, A2.

External reaction means 203 has a shape complementary to that of first or second friction elements 201, 202, so as to allow frictional coupling of first and second friction elements 201, 202 when second actuator 330 applies an axial load frontward in order to set second clutch 200 in its engaged position. As a non-limiting example, reaction means 230 can be in the shape of a ring having a tooth set on the external periphery and a central abutment groove that extends axially rearward.

Second clutch 200 is preferably of the multiple-disc type. It comprises at least one first friction element 201, for example a friction disc. First friction elements 201 are rotationally coupled to second transmission shaft A2 by means of a second output disc carrier 210 constituting an output element of second clutch 200.

Second output disc carrier 210 has on its external radial periphery an axial prolongation 207 that is equipped with a tooth set intended to interact with a complementary tooth set on each first friction element 201, and more specifically on the radially internal periphery of each first friction element 201. The second output disc carrier is thus rotationally coupled, by meshing, to first friction elements 201.

At its lower radial end, second output disc carrier 210 is connected to a second output web 220. Second output disc carrier 210 and second output web 220 are preferably fastened together by welding, as a variant by riveting.

Second output hub 220 has, radially internally, axial splines configured to interact with complementary splines arranged on second transmission shaft A2, in order to implement a rotational coupling.

Second transmission shaft A2 is preferably in the shape of a hollow cylinder into the interior of which first transmission shaft A1 can be inserted.

Second clutch 200 also comprises elastic return means to push second actuator 330 automatically back into a disengaged position. The elastic return means are preferably constituted by elastic washers such as spring washers of the "Onduflex™" type. The elastic return washers are interposed axially between second friction elements 201, 202. They are preferably situated radially inside first friction elements 201. Each elastic return washer is axially in abutment against the front radial face of a second friction element 202 and against the rear radial face of another, axially adjacent, second friction element 202.

The elastic return means axially stress the second friction elements in order to facilitate the release of first friction elements 201 and the return of second actuator 330 toward the disengaged position.

As a variant (not depicted), the return means of second actuator 330 are constituted by at least one spring.

Input disc carrier 106 furthermore comprises a so-called "internal" segment 111 that extends radially toward the interior of clutch mechanism 10 at opening 108, and axially frontward. At its lower end, internal segment 111 of input disc carrier 106 abuts against a heel 118 radially abutting against a rolling bearing 113 configured to support the radial load of input disc carrier 106.

Radially, rolling bearing 113 is connected integrally to a clutch support 500 arranged in an intermediate axial position between control system 300 and first and second output hubs 120, 220.

Axially, the position of rolling bearing 113 is defined toward the front by a stop 114. Stop 114 can preferably be of the locking ring or retention ring type. In addition, stop 114 can preferably be received in a groove implemented on the peripheral surface of clutch support 500.

More generally, rolling bearing 113 is disposed radially between clutch support 500 and input disc carrier 106. Axially, rolling bearing 113 is retained axially by a retention ring 114 disposed on the side opposite from the axial load applied by first or second actuator 320, 330.

Advantageously, rolling bearing 113 is of the oblique-contact bearing type, so that an axial load and a radial load can be transmitted simultaneously. That axial load is taken up at rolling bearing 113 by stop 114. Specifically, when first or second actuator 320, 330 transmits an axial load to first or second force member 105, 205 in order to set the corresponding clutch 100, 200 in an engaged or disengaged configuration, an axial load is transmitted between a first end comprising said first or second actuator 320, 330 and a second end arranged at transmission shaft A1, A2, and more specifically at second locking element 600. All the elements participating in the transmission of an axial load upon operation of the clutch, and arranged axially between second locking element 600 and first or second actuator 320, 330, are axially locked so that said axial load can be transmitted.

Clutch support 500 is connected to control system directly or indirectly 300 depending on the various embodiments of clutch mechanism 10 in accordance with the first aspect of the invention, which will now be described. Each embodiment that is illustrated hereinafter allows clutch mechanism 10 to be axially locked and rotationally coupled along the transmission drivetrain. Only some of the specific features and technical and functional differences of each embodiment will be described, by comparison with the general embodiment described above by way of FIGS. 1 and 2 and in order to facilitate understanding of the invention.

In the first embodiment described by way of FIG. 1, control system 300 is firstly connected integrally to transmission 400 via an axial coupling and a rotational coupling, so as to prevent any relative movement—axially, radially, and around axis O—between said control system 300 and said transmission 400. At least axial locking of clutch mechanism 10 is then implemented in particular by means of clutch support 500, in order to prevent a rearward movement of said clutch mechanism 10 with respect to transmission 400. As a non-limiting example, this can involve installation using assembly screws.

To achieve this, control system 300 is firstly fastened to transmission 400 by means of at least one fastening means 310 configured to interact with at least one complementary fastening means 401 of transmission 400. The at least one fastening means 310 is preferably arranged on a portion extended radially outward from housing 307 of control system 300, called an "upper portion" 301, in order to allow easy access from the rear during installation of said control system 300 on said transmission 400. Preferably, upper portion 301 extends radially farther outward than the other portions of control system 300. In the example illustrated, fastening means 310 comprises three fastening regions distributed radially around axis O.

In the example illustrated in FIG. 1, fastening means 310 comprise at least one screw configured to be inserted into an internal thread implemented on face 402 of transmission 400 facing toward control system 300. The result is to implement both axial and radial locking of control system 300 on transmission 400.

Control system 300 furthermore comprises a first axial locking element with which robust and consistent axial coupling of control system 300 with respect to transmission 400 during the operation of clutch mechanism 10 can be ensured, said axial locking preventing any frontward or rearward relative movement of control system 300 with respect to transmission 400. In the example illustrated in FIG. 1, the first axial locking element comprises a planar abutment implemented between abutment face 304 of control system 300 and opposite face 402 of transmission 400.

Potentially, the fastening means comprise at least two pins coacting jointly between transmission 400 and control system 300, and more specifically housing 307.

When control system 300 is connected integrally to transmission drivetrain 400, the clutch mechanism can be deployed along transmission shafts A1 and A2 in order to implement installation thereof on the transmission drivetrain.

To achieve this, clutch support 500 is axially and rotationally coupled to control system 300 thanks respectively to an axial coupling means and to a rotational coupling means different from said axial coupling means.

The rotational coupling means comprises first splines 303 arranged on a seat of control system 300 and second splines 503 arranged on a complementary seat of clutch support 500. According to a first variant, the first splines are of the male type and the second splines are of the female type. According to a second variant, the first splines are of the female type and the second splines are of the male type.

In complementary fashion, the axial coupling means is configured to prevent any axial and rearward relative movement between clutch support 500 and control system 300.

A seat 305, extending axially frontward, of lower part 302 of housing 307 of control system 300 carries an axial abutment stop 306 against which a front face 504 interacts in order to implement axial locking. Clutch support 500 is thereby axially locked toward the front. In the example illustrated in FIG. 1, axial locking between control system 300 and clutch support 500 comprises planar abutment of front face 504 against axial abutment stop 306.

In the example illustrated in FIG. 1, stop 305 is materially integral with housing 307 of control system 300.

Preferably, the axial abutment stop is arranged in an internal space 212 of second force transmission member 205.

Toward the front, clutch support 500 is axially locked by means of bearings 115 and 116 arranged respectively between clutch support 500 and second output hub 220, and between second and first output hubs 220 and 120 and a second axial locking element 600 arranged on first transmission shaft A1. Second axial locking element 600 is more specifically arranged in front of first output hub 120 of first clutch 100, and it is in planar abutment with said first output hub 120.

Bearings 115 and 116 thus allow an axial load to be transmitted despite the differential rotation between first and second output hubs 120, 220.

As non-limiting examples, the bearings can be ball bearings or needle bearings.

Second axial locking element 600 is thus configured to prevent any axial movement of first output hub 120 on first transmission shaft A1.

Second axial locking element 600 is preferably received in a groove 610 arranged on a peripheral contour of first transmission shaft A1.

In ingenious fashion, second axial locking element 600 is accessed thanks to a bore 131 implemented on input hub 130. Radially, the dimensions of bore 131 are such that a non-zero space remains between upper face 601 of second axial locking element 600 and internal face 132 of bore 131. The respective radial dimensions of bore 131 and of second axial locking element 600 are preferably such that it is possible to insert a grasping tool into the bore in order to put said second axial locking element 600 in place, potentially into groove 610 with which it can interact.

In this first embodiment, the axial dimensions of seat 305 of control system 300 and/or of clutch support 500 are respectively adjusted so that second axial locking element 600 is in abutment against front face 121 of first output hub 120.

More specifically, the distance between abutment face 304 arranged at the rear of control system 300 and axial abutment stop 306 arranged on seat 305 of said control system 300 is adjusted so as to eliminate any remaining play between those two parts when clutch mechanism 10 is assembled. A minimal functional play is potentially tolerated.

In this first embodiment, the system for axial locking of clutch mechanism 10 on the transmission drivetrain therefore comprises:

- a first element for axial locking of control system 300 on transmission 400, said first axial locking element being configured preferably to implement an abutment of the planar abutment type of abutment face 304 of the control system against opposite face 402 of the transmission;
- a second axial locking element 600 arranged at the level of first transmission shaft A1, configured to implement an axial abutment, preferably of the planar abutment type, against first output hub 120 and more specifically against its front face 121;
- an axial abutment between clutch support 500 and control system 300, said axial abutment being configured to prevent any frontward axial relative movement of said control system 300 with respect to said clutch support 500.

In this first embodiment, the rotational coupling means comprises first splines 303 arranged on control system 300 and configured to interact with second splines 503 arranged on clutch support 500, in order to implement a rotational coupling between said clutch support 500 and said control system 300. First splines 303 are preferably of the male type, and second splines 503 are preferably of the female type.

Figure 2:
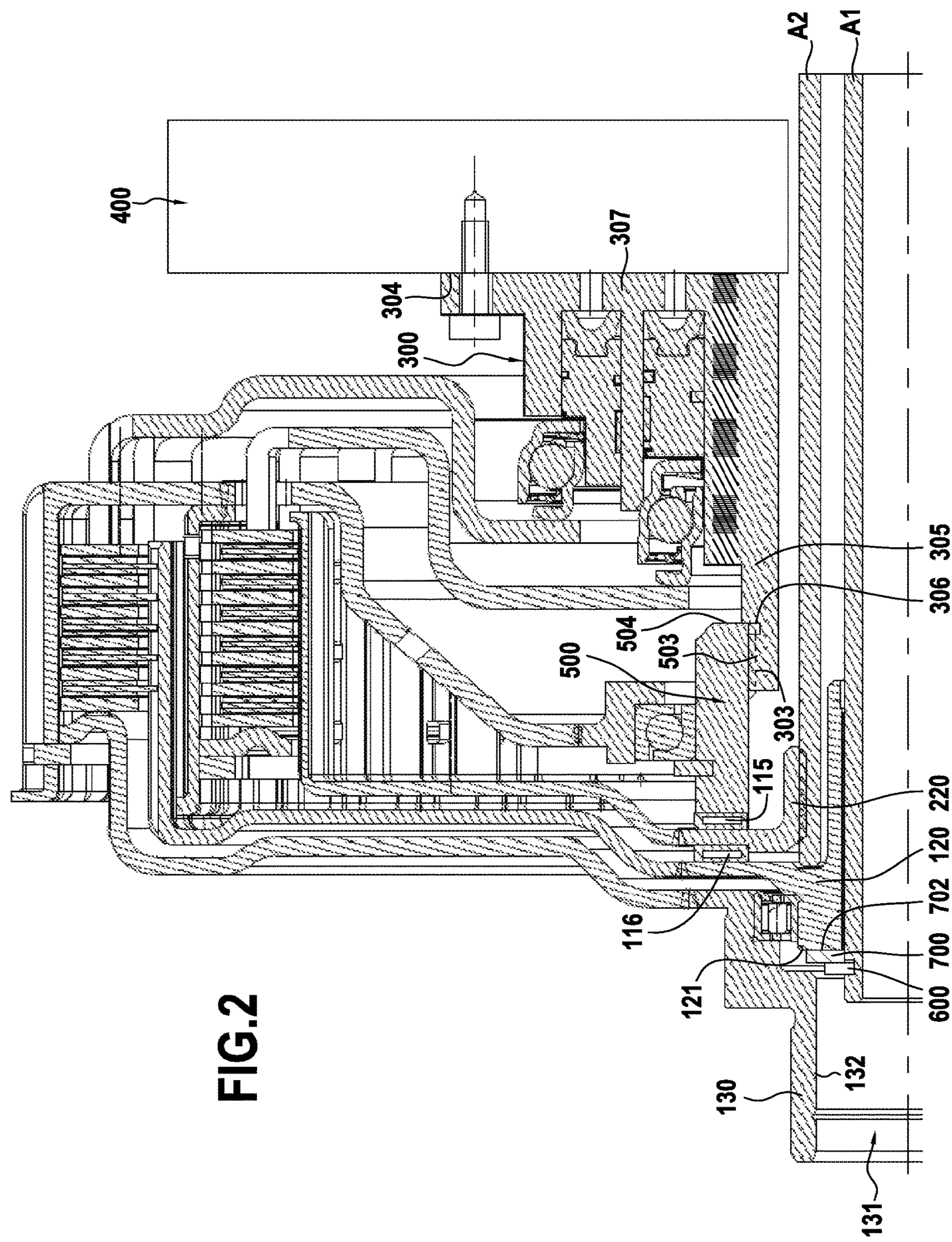
FIG. 2 is an axial section view of a transmission system comprising a dual wet clutch mechanism, in accordance with the first aspect of the invention and according to a second embodiment.

The second embodiment of a clutch mechanism 10 in accordance with the first aspect of the invention is described by way of FIG. 2. To facilitate understanding thereof, only the differences with respect to the first embodiment are described below.

The rotational coupling means corresponds entirely to the one implemented in the first embodiment: it comprises first splines 303, preferably of the male type, arranged on control system 300 and configured to interact with second splines, preferably of the female type, arranged on clutch support 500, in order to implement a rotational coupling between said clutch support 500 and said control system 300.

The second axial locking element of the second embodiment differs from the second axial locking element of the first embodiment only in that it comprises, in complementary fashion, a spacer 700 arranged in an intermediate position between second axial locking element 600 and rear face 121 of first output hub 120.

Spacer 700 is adjusted so as to implement on the one hand a first planar abutment between rear face 701 and second axial locking element 600, and on the other hand a second planar abutment between front face 702 and front face 121 of first output hub 120.

The axial dimension of spacer 700 is adjusted so as to limit or even eliminate any axial play along the transmission drivetrain, more specifically:

- between abutment face 304 arranged at the rear of control system 300 and axial abutment stop 306 arranged on seat 305 of said control system;
- between clutch support 500 and bearing 115;
- between bearing 115 and second output hub 220;
- between second output hub 220 and bearing 116;
- between bearing 116 and first output hub 120;
- between first output hub 120 and spacer 700.

Figure 3:
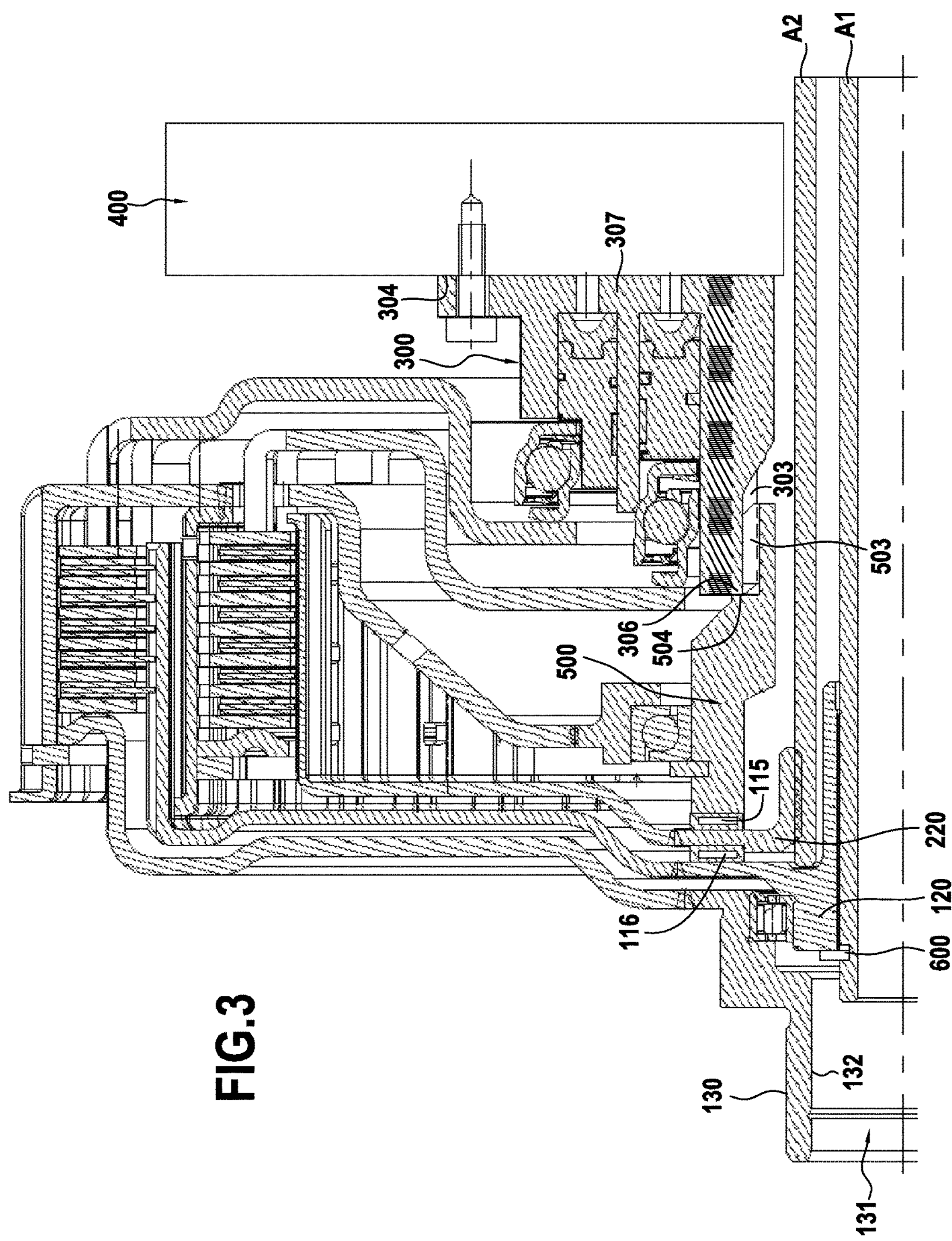
FIG. 3 is an axial section view of a transmission system comprising a dual wet clutch mechanism, in accordance with the first aspect of the invention and according to a third embodiment.

The third embodiment of a clutch mechanism 10 in accordance with the first aspect of the invention is described by way of FIG. 3. To facilitate understanding thereof, only the differences with respect to the first embodiment are described below.

The rotational coupling means differs from that implemented in the first embodiment only in that it comprises first splines 303, preferably of the female type, arranged on control system 300 and configured to interact with second splines 503, preferably of the male type, arranged on clutch support 500, in order to implement rotational coupling between said clutch support 500 and said control system 300.

The axial locking system of the third embodiment is entirely identical to the one implemented and described in the first embodiment. It comprises:

- a first element for axial locking of control system 300 on transmission 400, said axial abutment being configured preferably to implement an abutment of the planar abutment type of abutment face 304 of the control system against opposite face 402 of the transmission;

a second axial locking element 600 arranged at the level of first transmission shaft A1, configured to implement an axial abutment, preferably of the planar abutment type, against first output hub 120 and more specifically against its front face 121;

an axial abutment between clutch support 500 and control system 300, said axial abutment being configured to prevent any frontward axial relative movement of said control system 300 with reference to said clutch support 500.

Figure 4:
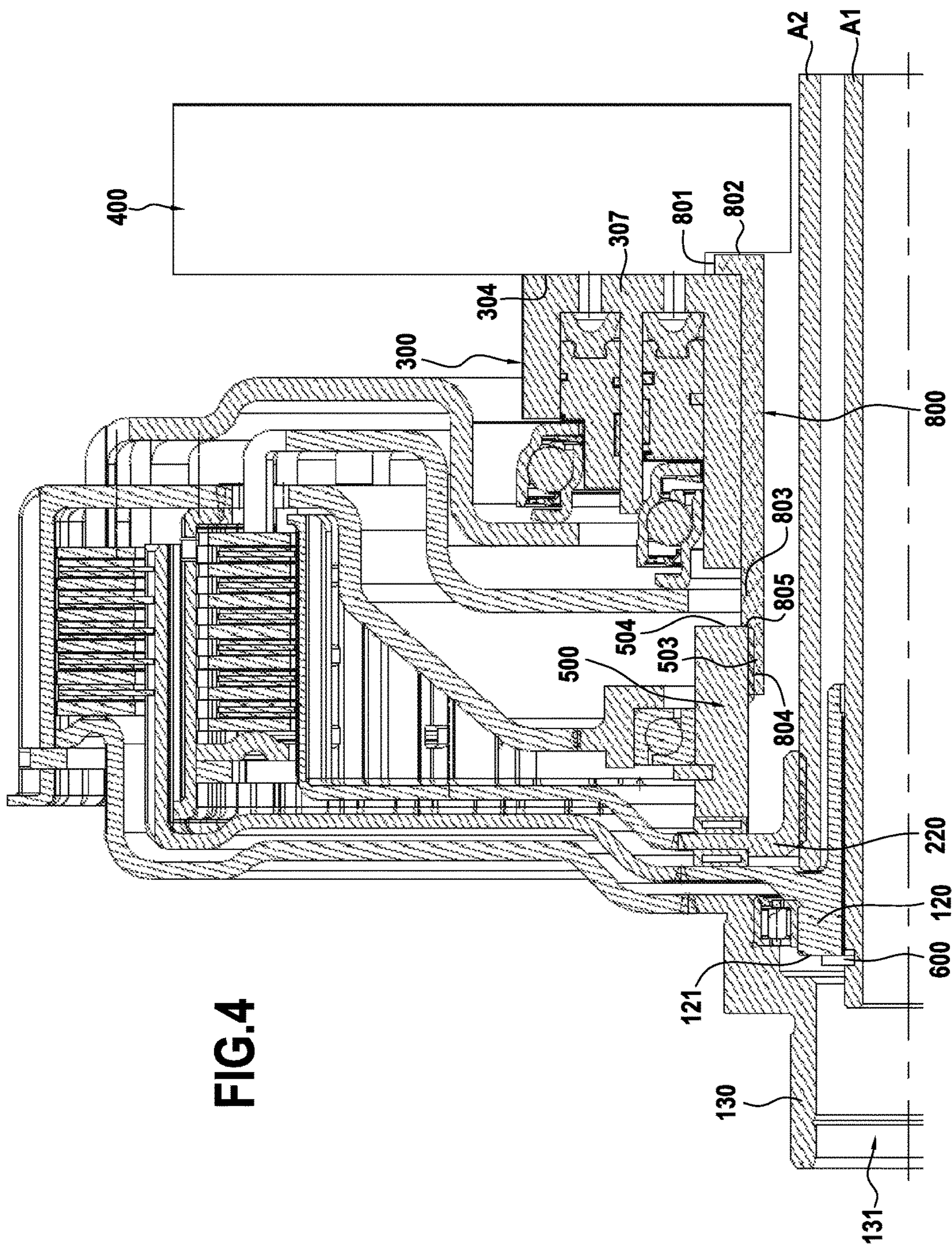
FIG. 4 is an axial section view of a transmission system comprising a dual wet clutch mechanism, in accordance with the first aspect of the invention and according to a fourth embodiment.

The fourth embodiment of a clutch mechanism 10 in accordance with the first aspect of the invention is described by way of FIG. 4. To facilitate understanding thereof, only the differences with respect to the first embodiment are described below.

In this fourth embodiment, actuation support 800 is applied onto housing 307 of control system 300. The actuation support is arranged radially between said control system 300 and second transmission shaft A2. Actuation support 800 is connected integrally (i.e., non-moveably) to housing 307 of control system 300.

According to a first variant, actuation support 800 is mounted in a bore of control system 300, and without radial play with regard to said control system 300. Alternatively, according to a second variant actuation support 800 is crimped into a bore of control system 300.

In this fourth embodiment as illustrated in FIG. 4, actuation support 800 is preferably installed with an axial play 802 with respect to transmission 400, so that an axial coupling with said transmission is not implemented at the level of said actuation support 800. In this case, axial coupling is preferably implemented at the level of abutment face 304 of control system 300 in order to ensure the absence of axial play. More specifically, abutment face 304 is in planar abutment against opposite face 402 of transmission 400.

Potentially, fastening means 310 such as assembly screws allow control system 300 to be fastened integrally onto transmission 400.

Actuation support 800 furthermore comprises, on its lower part, a seat 804 extending axially frontward. Seat 804 comprises an axial abutment stop 806 configured to implement axial abutment of clutch support 500 on said actuation support 800 in order to prevent rearward axial relative movement between said clutch support 500 and said actuation support 800.

In this fourth embodiment, the axial dimensions of actuation support 800 and/or of clutch support 500 are respectively adjusted so that second axial locking element 600 is in abutment against rear face 121 of first output hub 120.

More specifically, the distance between abutment face 304 arranged at the rear of control system 300 and axial abutment stop 806 arranged on seat 803 of actuation support 800 is adjusted so as to eliminate any remaining play between those two parts when clutch mechanism 10 is assembled. A minimal functional play is potentially tolerated.

In this fourth embodiment, the system for axial locking of clutch mechanism 10 on the transmission drivetrain therefore comprises:

a first element for axial locking of control system 300 on transmission 400, said axial abutment being configured to implement preferably an abutment of the planar abutment type of abutment face 304 of the control system against opposite face 402 of the transmission, and control system 300 being axially integral with actuation support 800;

a second axial locking element 600 arranged at the level of first transmission shaft A1, configured to implement an axial abutment, preferably of the planar abutment type, against first output hub 120 and more specifically against its front face 121;

an axial abutment between clutch support 500 and actuation support 800, said axial abutment being configured to prevent any frontward axial relative movement of said actuation support 800 with respect to said clutch support 500.

In this fourth embodiment, the rotational coupling means comprises first splines 805 arranged on actuation support 800 and configured to interact with second splines 503 arranged on clutch support 500, in order to implement a rotational coupling between said clutch support 500 and said actuation support 800.

First splines 805 are preferably of the female type, and second splines 503 are preferably of the male type.

The means for rotational coupling of transmission 400 to actuation support 800 and/or control system 300 furthermore comprises assembly screws.

The invention is of course not limited to the examples that have just been described, and numerous modifications can be made to those examples without going beyond the framework of the invention. In particular, the various characteristics, forms, variants, and embodiments of the invention can be associated with one another in a variety of combinations provided they are not mutually incompatible or exclusive. In particular, all the variants and embodiments described above can combined with one another.

The invention claimed is:

1. A clutch mechanism intended to be installed between an engine and a transmission of a motor vehicle, the clutch mechanism comprising:

a subassembly comprising:

a clutch;

a clutch support (500) configured to support the clutch radially by a rolling bearing (113); and an output hub;

a clutch control system (300) comprising a housing (307) and an annular piston configured to move axially with respect to the housing (307) in order to engage or disengage the clutch, the clutch support (500) being arranged in an axially intermediate position between the control system (300) and the output hub;

an axial locking system for axial locking of the clutch control system with respect to the clutch, the axial locking system comprising:

a first axial locking element (304, 402) configured to implement at least an axial retention between the control system (300) and the transmission (400);

a second axial locking element (600) configured to provide an axial retention between the clutch and a shaft (A1, A2) of the transmission, the second axial locking element (600) axially engaging both the shaft (A1, A2) of the transmission (400) and the output hub of the clutch; and a rotational coupling device (303, 503) for non-rotatably coupling of the clutch support (500) with respect to the control system (300), the rotational coupling device (303, 503) being different from the axial locking system;

the rotational coupling device (303, 503) comprising first splines (303) arranged on the clutch control system (300) and second splines (503) arranged on the clutch support (500), the first splines non-rotatably engaging the second splines.

2. The clutch mechanism according to claim 1, wherein the clutch is a first multiple-disc clutch (100), wherein the output hub is a first output hub (120), wherein the subassembly further comprises a second multiple-disc clutch (200) and a second output hub (220), wherein the shaft of the transmission includes a first shaft (A1) and a second shaft (A2), and wherein the control system (300) comprises a first annular piston (320) and a second annular piston (330) configured respectively to couple or decouple the first clutch (100) and the second clutch (200) onto or from the first shaft (A1) or the second shaft (A2) of the transmission.

3. The clutch mechanism according to claim 2, wherein an actuation support (800) is at least rotationally coupled to the housing (307) of the control system (300).

4. The clutch mechanism according to claim 1, wherein the second axial locking element (600) comprises a retention ring.

5. The clutch mechanism according to claim 4, wherein the second axial locking element (600) furthermore comprises a spacer (700) interposed axially between the retention ring and the output hub.

6. The clutch mechanism according to claim 1, wherein the first axial locking element (304, 402) comprises an abutment face (304) of the housing (307) facing the transmission (400).

7. A method for installing the clutch mechanism according to claim 1, the method comprising at least the following steps:

axially abutting the control system (300) against the transmission (400);

non-rotatably coupling the clutch to the control system (300) by inserting the clutch support (500) onto a circumferential seat (305) of the control system (300) and axially abutting the clutch support (500) against the control system (300); and axially locking the clutch support (500) on the transmission shaft (A1, A2) by inserting a retention ring into a groove of the transmission shaft (A1, A2).

8. The method according to claim 7, wherein the step of axially locking the clutch support (500) onto the transmission shaft comprises an intermediate step of inserting a spacer (700) between the output hub of the clutch and the retention ring, in order to reduce the axial play between the clutch support (500) and the control system (300).

9. A clutch mechanism intended to be installed between an engine and a transmission of a motor vehicle, the clutch mechanism comprising:

a subassembly comprising:

a clutch;

a clutch support (500) configured to support the clutch radially by a rolling bearing (113); and an output hub;

a clutch control system (300) comprising a housing (307) and an annular piston configured to move axially with respect to the housing (307) in order to engage or disengage the clutch, the clutch support (500) being arranged in an axially intermediate position between the control system (300) and the output hub of the clutch mechanism;

an axial locking system for axial locking of the clutch control system with respect to the clutch, the axial locking system comprising:

a first axial locking element (304, 402) configured to implement at least an axial retention between the control system (300) and the transmission (400);

a second axial locking element (600) configured to provide an axial retention between the clutch and a shaft (A1, A2) of the transmission, the second axial locking element (600) axially engaging both the shaft (A1, A2) of the transmission (400) and the output hub of the clutch; and a rotational coupling device (805, 503) for non-rotatably coupling of the clutch support (500) with respect to the control system (300), the rotational coupling device (805, 503) being different from the axial locking system; and an actuation support (800) mounted to the housing (307) of the control system (300) and non-rotatably coupled to the housing (307) of the control system (300), the rotational coupling device (805, 503) comprising first splines (805) arranged on the clutch control system (300) and second splines (503) arranged on the clutch support (500), the first splines being male splines and the second splines being female splines.

10. The clutch mechanism according to claim 9, wherein the actuation support (800) is integral with the housing (307) of the control system (300).

11. The clutch mechanism according to claim 10, wherein the clutch support (500) is in abutment against a circumferential seat on the actuation support (800) and arranged axially between the annular piston of the control system (300) and the output hub of the clutch.

12. The clutch mechanism according to claim 11, wherein the first splines (303) are arranged on the circumferential seat (305), and wherein the second splines (503) are arranged on a complementary seat of the clutch support (500).

13. The clutch mechanism according to claim 12, wherein the rotational coupling device is disposed axially in an internal space of a force transmission member (105, 205).

14. The clutch mechanism according to claim 9, wherein the actuation support (800) is applied onto the housing (307) of the control system (300).

15. The clutch mechanism according to claim 14, wherein the clutch support (500) is in abutment against a circumferential seat on the actuation support (800) and arranged axially between the annular piston of the control system (300) and the output hub of the clutch.

* * * * *